United States Patent
Shetty

(10) Patent No.: US 11,343,208 B1
(45) Date of Patent: May 24, 2022

(54) AUTOMATED RELEVANT SUBJECT MATTER DETECTION

(71) Applicant: West Corporation, Omaha, NE (US)

(72) Inventor: Santhosh M. Shetty, Omaha, NE (US)

(73) Assignee: INTRADO CORPORATION, Omaha, NE (US)

( * ) Notice: Subject to any disclaimer, the term of this patent is extended or adjusted under 35 U.S.C. 154(b) by 387 days.

(21) Appl. No.: 16/360,817

(22) Filed: Mar. 21, 2019

(51) Int. Cl.
| | |
|---|---|
| *G06F 16/24* | (2019.01) |
| *H04L 51/02* | (2022.01) |
| *H04L 51/00* | (2022.01) |
| *G06F 16/955* | (2019.01) |
| *G06F 16/2457* | (2019.01) |
| *H04L 51/226* | (2022.01) |
| *G06F 40/40* | (2020.01) |

(52) U.S. Cl.
CPC ........ *H04L 51/02* (2013.01); *G06F 16/24578* (2019.01); *G06F 16/9566* (2019.01); *G06F 40/40* (2020.01); *H04L 51/16* (2013.01); *H04L 51/26* (2013.01)

(58) Field of Classification Search
CPC ........ G06Q 50/01; G06N 3/006; G06N 5/043; H04L 51/32; H04L 12/1818; H04L 67/22; H04L 51/26; H04L 51/16; H04L 51/02; G06F 16/9535; G06F 16/24578; G06F 16/951; G06F 3/0482; G06F 16/2455; G06F 16/953; G06F 16/9566; G06F 40/40
See application file for complete search history.

(56) References Cited

U.S. PATENT DOCUMENTS

| | | | |
|---|---|---|---|
| 10,360,265 B1* | 7/2019 | Agarwal | G06F 16/90332 |
| 11,070,949 B2* | 7/2021 | Gross | G06F 9/445 |
| 2007/0124432 A1* | 5/2007 | Holtzman | G06F 40/30 709/219 |
| 2009/0210405 A1* | 8/2009 | Ortega | G06Q 10/10 |
| 2010/0281399 A1* | 11/2010 | Banker | G06Q 30/0283 715/758 |
| 2012/0290950 A1* | 11/2012 | Rapaport | H04N 21/8358 715/753 |
| 2016/0371276 A1* | 12/2016 | Furtado | G06F 16/24578 |
| 2018/0098030 A1* | 4/2018 | Morabia | H04L 65/1089 |
| 2018/0331839 A1* | 11/2018 | Gao | G06Q 10/107 |
| 2019/0362023 A1* | 11/2019 | Bostick | G06F 16/9535 |
| 2019/0370413 A1* | 12/2019 | Sehgal | G10L 15/22 |
| 2019/0371303 A1* | 12/2019 | Siva Kumaran | G06F 16/951 |

(Continued)

*Primary Examiner* — Merilyn P Nguyen

(57) ABSTRACT

One example method of operation may include identifying, via a bot, a query to retrieve content information in a content sharing forum, transmitting the query with the content information to a number of other bots, and each of the number of bots are associated with respective different content sharing forums, creating a number of queries based on the query, transmitting the number of queries to a respective number of caches associated with the respective different content sharing forums to identify whether relevant information associated with the number of queries is available for retrieval, receiving a number of results based on the number of queries, ranking the number of results to determine relevancy of the number of results, selecting the higher ranked results of the number of results, and creating one or more messages in the content sharing forum with at least one of the higher ranked results and links to the higher ranked results.

20 Claims, 11 Drawing Sheets

(56) References Cited

U.S. PATENT DOCUMENTS

2020/0285810 A1* 9/2020 Di Rosa ................. G06F 40/279
2020/0356608 A1* 11/2020 Ogawa ................... G06F 3/167
2021/0248170 A1* 8/2021 Stanton .................. G10L 15/22

* cited by examiner

150

---

TOPICS: XYZ COMPUTER ISSUES, XYZ DRIVER ISSUES, XYZ SERVER ISSUES, XYZ DATABASE ISSUES
112

DISCUSSION GROUP TOPIC:
XYZ COMPANY COMPUTER ISSUES
114

USER A - 116
Generally, the most common problems are boot-up, battery issues, bluetooth connectivity and profile setup, I have answers to all those common problems. 04-06-2019 – 10:01 PM

USER B - 118
I cannot boot-up, it is just stuck in load...04-06-2019 – 10:31 PM

USER C - 122
The boot-up is taking forever...04-07-2019 – 11:03 PM

USER D - 124
I cannot link my headphones to the bluetooth feature...04-08-2019 – 09:33 PM

USER E - 126
I am losing battery fast with some new applications installed...04-08-2019 – 08:35 PM

USER A - 116
Try ctrl+shift+D on boot-up.
Turn bluetooth on via the F8 key
Turn off bluetooth to save battery. 04-08-2019 – 09:23 PM

USER F - 132
I am here for all issues related to XYZ company products
04-09-2019 – 08:13 AM

USER D - 124
Can you explain why the CD-ROM is always spinning...04-10-2019 – 10:32 AM 146
NOTIFICATIONS:
USER A is a SME on
XYZ questions.

Click underlined sections to access topics for SME USER A:
- XYZ computer <u>boot-up</u>
- XYZ computer <u>bluetooth</u>
- XYZ computer <u>battery</u>

| https:/.../discussionforum...xyz company | https:/.../forumnext...xyz company |
|---|---|
| TOPICS: XYZ COMPUTER ISSUES, XYZ DRIVER ... 112 | TOPICS: XYZ COMPUTER ISSUES, XYZ SOFTWARE ... 152 |
| DISCUSSION GROUP TOPIC: XYZ COMPANY COMPUTER ISSUES 114 | DISCUSSION GROUP TOPIC: XYZ COMPANY COMPUTER ISSUES 154 |
| USER A – 116 - Generally, the most common problems are boot-up, battery issues, bluetooth connectivity and profile setup, I have answers to all those common problems. 04-06-2019 – 10:01 PM | USER G – 156 – I am having trouble finding answers to XYZ company computer issues. 04-10-2019 – 11:01 PM |

USER B – 118 - I cannot boot-up, it is just stuck in load...04-06-2019 – 10:31 PM USER C – 122 - The boot-up is taking forever...04-07-2019 – 11:03 PM USER D – 124 - I cannot link my headphones to the bluetooth feature...04-08-2019 – 09:33 PM USER E – 126 - I am losing battery fast with some new applications installed...04-08-2019 – 08:35 PM

USER A – 116 - Try ctrl+shift+D on boot-up.
04-08-2019 – 09:23 PM
Turn bluetooth on via the F8 key
Turn off bluetooth to save battery.

USER F – 132 - I am here for all issues related to XYZ company products
04-09-2019 – 08:13 AM USER D – 124 - Can you explain why the CD-ROM is always spinning...04-10-2019 – 10:32 AM

146 NOTIFICATIONS:
USER A is a SME on
XYZ questions from discussionforum.

Click underlined sections to access topics for SME USER A:
- XYZ computer <u>boot-up</u>
- XYZ computer <u>bluetooth</u>
- XYZ computer <u>battery</u>

DISCUSSION GROUP TOPIC:
XYZ COMPANY COMPUTER ISSUES
114

USER A - 116
Generally, the most common problems are boot-up, battery issues, bluetooth connectivity and profile setup, I have answers to all those common problems. 04-06-2019 – 10:01 PM > USER B - 118
> I cannot boot-up, it is just stuck in load...04-06-2019 – 10:31 PM
>
> USER C - 122
> The boot-up is taking forever...04-07-2019 – 11:03 PM
>
> USER D - 124
> I cannot link my headphones to the bluetooth feature...04-08-2019 – 09:33 PM
>
> USER E - 126
> I am losing battery fast with some new applications installed...04-08-2019 – 08:35 PM

USER A - 116
Try ctrl+shift+D on boot-up. 04-08-2019 – 09:23 PM
Turn bluetooth on via the F8 key
Turn off bluetooth to save battery

USER F - 132
I am here for all issues related to XYZ company products
04-09-2019 – 08:13 AM > USER D - 124
> Can you explain why the CD-ROM is always spinning...04-10-2019 – 10:32 AM

NLP SUMMARY 160

- NUMBER OF PARSED TERMS...
- NUMBER OF TOPIC CATEGORIES...
- NUMBER OF POTENTIAL SMES...TWO (2)
- SME #1 USER A – WEIGHT (W4)
- SME #2 USER F – WEIGHT (W1)

FIG. 2

AUTOMATED RELEVANT SUBJECT MATTER DETECTION

TECHNICAL FIELD OF THE APPLICATION

This application relates to subject matter detection, and more specifically to automated relevant subject matter detection with information processing applications.

BACKGROUND OF THE APPLICATION

Conventionally, blogs, social network applications, online forums, and chat rooms have always been sources of information. Most content is publicly accessible and is available online via standard queries performed through search engines. Identifying relevant content when attempting to identify answers to specific questions can be burdensome. Users may submit queries into search engines and then peruse the results of various chat rooms to identify similar topics of interest.

One example may be when a user is having trouble operating a smartphone, an application on the smartphone, their personal computer, a software application operating on their personal computer, etc. The use of chat rooms has become so popular that even major manufacturers are hiring their own experts to seek out customers of their products in chat rooms and offer answers to frequently asked questions, especially since loopholes and other issues with hardware and software are often repeating with various different customers using the same or similar products.

In a particular chat room, certain leaders of topics may have many followers, topics of interest, posts, answers, sub-topics, threads, etc. Those posts which are deemed popular by others are linked to 'power users' or subject matter experts (SMEs). The title SME may be a person providing responses to users questions or many users sharing a common name, the SME may also be an automated 'bot' or virtual assistant that is processing questions from users via natural language processing and providing content from a large databank in response to content of those questions.

The SME does not have to be based on a real person or an employee of a company representing a product that is the topic of discussion, the SME is merely a forum member with a name or title that is providing answers to questions and is receiving acclaim from the members via a number of responses, positive feedback (e.g., rankings). The SME may be a bot or a combination of various information sources. A popular forum site, such as STACKOVERFLOW offers answers to questions on many different topics. People can sign up, ask questions, search for answers and select topics which are relevant to their interests and identify answers to questions which have already been asked and answered for quick results and a potential solution to their problem. Most forums offer information in the form of question and answer. Generally, the more relevant answers are linked to responses from highly ranked or popular members, those members are labeled SMEs. Identifying which SMEs are relevant to certain discussion topics and providing such information to users seeking answers to certain questions would create provide an optimal result to end users.

SUMMARY OF THE APPLICATION

Example embodiments of the present application provide at least a method that includes at least one of identifying a content thread in a content sharing forum, indexing all messages included in the content thread according to content of the messages to identify a plurality of topics, ranking the plurality of topics of the content thread to identify highest weighted topics based on content of messages included in the topics, identifying one or more topic experts associated with the highest weighted topics, creating a notification comprising the one or more topic experts and the highest weighted topics, and posting the notification in the content sharing forum.

Another example embodiment may include an apparatus that includes a processor configured to identify a content thread in a content sharing forum, index all messages included in the content thread according to content of the messages to identify a plurality of topics, rank the plurality of topics of the content thread to identify highest weighted topics based on content of messages included in the topics, identify one or more topic experts associated with the highest weighted topics, create a notification comprising the one or more topic experts and the highest weighted topics, and post the notification in the content sharing forum.

Another example embodiment may include a non-transitory computer readable storage medium configured to store instructions that when executed cause a processor to perform identifying a content thread in a content sharing forum, indexing all messages included in the content thread according to content of the messages to identify a plurality of topics, ranking the plurality of topics of the content thread to identify highest weighted topics based on content of messages included in the topics, identifying one or more topic experts associated with the highest weighted topics, creating a notification comprising the one or more topic experts and the highest weighted topics, and posting the notification in the content sharing forum.

Still yet another example embodiment provides a method that includes at least one of identifying a content thread in a content sharing forum, ranking topics of the content thread to identify highest weighted topics based on content of messages included in the topics, creating a share link to access the highest weighted topics, and posting the share link in one or more other content threads of one or more other content sharing forums, and the one or more other content threads comprise topics with similar content to content of the highest weighted topics of the content thread.

Still yet another example embodiment may include an apparatus that includes a processor configured to identify a content thread in a content sharing forum, rank topics of the content thread to identify highest weighted topics based on content of messages included in the topics, create a share link to access the highest weighted topics, and post the share link in one or more other content threads of one or more other content sharing forums, and the one or more other content threads includes topics with similar content to content of the highest weighted topics of the content thread.

Still yet a further example embodiment may include a non-transitory computer readable storage medium configured to store instructions that when executed cause a processor to perform identifying a content thread in a content sharing forum, ranking topics of the content thread to identify highest weighted topics based on content of messages included in the topics, creating a share link to access the highest weighted topics, and posting the share link in one or more other content threads of one or more other content sharing forums, and the one or more other content threads include topics with similar content to content of the highest weighted topics of the content thread.

Yet still another example embodiment may include a method that includes identifying a content thread in a content sharing forum, assigning a bot to process messages of the content thread, identifying, via the bot, a question message, parsing the question message content to identify topics of interest, processing the messages of the content thread to identify response information related to the question message, determining the response information to the question message requires third party information, and transmitting a request, including the question message content, to one or more other bots operating in other content sharing forums.

Still another example embodiment includes an apparatus that includes a processor configured to identify a content thread in a content sharing forum, assign a bot to process messages of the content thread, identify, via the bot, a question message, parse the question message content to identify topics of interest, process the messages of the content thread to identify response information related to the question message, determine the response information to the question message requires third party information, and a transmitter configured to transmit a request, comprising the question message content, to one or more other bots operating in other content sharing forums.

Still a further example embodiment may include a non-transitory computer readable storage medium configured to store instructions that when executed cause a processor to perform identifying a content thread in a content sharing forum, assigning a bot to process messages of the content thread, identifying, via the bot, a question message, parsing the question message content to identify topics of interest, processing the messages of the content thread to identify response information related to the question message, determining the response information to the question message requires third party information, and transmitting a request, comprising the question message content, to one or more other bots operating in other content sharing forums.

Still yet another example embodiment provides a method that includes identifying, via a bot, a query to retrieve content information in a content sharing forum, transmitting the query comprising the content information to a plurality of other bots, wherein each of the plurality of bots are associated with respective different content sharing forums, creating a plurality of queries based on the query, transmitting the plurality of queries to a respective plurality of caches associated with the respective different content sharing forums to identify whether relevant information associated with the plurality of queries is available for retrieval, receiving a plurality of results based on the plurality of queries, ranking the plurality of results to determine relevancy of the plurality of results, selecting the higher ranked results of the plurality of results, and creating one or more messages in the content sharing forum comprising at least one of the higher ranked results and links to the higher ranked results.

Still yet another example embodiment provides an apparatus that includes a processor configured to identify, via a bot, a query to retrieve content information in a content sharing forum, transmit the query comprising the content information to a plurality of other bots, each of the plurality of bots are associated with respective different content sharing forums, create a plurality of queries based on the query, transmit the plurality of queries to a respective plurality of caches associated with the respective different content sharing forums to identify whether relevant information associated with the plurality of queries is available for retrieval, receive a plurality of results based on the plurality of queries, rank the plurality of results to determine relevancy of the plurality of results, select the higher ranked results of the plurality of results, and create one or more messages in the content sharing forum with at least one of the higher ranked results and links to the higher ranked results.

Still yet a further example embodiment may include a non-transitory computer readable storage medium configured to store instructions that when executed cause a processor to perform identifying, via a bot, a query to retrieve content information in a content sharing forum, transmitting the query comprising the content information to a plurality of other bots, each of the plurality of bots are associated with respective different content sharing forums, creating a plurality of queries based on the query, transmitting the plurality of queries to a respective plurality of caches associated with the respective different content sharing forums to identify whether relevant information associated with the plurality of queries is available for retrieval, receiving a plurality of results based on the plurality of queries, ranking the plurality of results to determine relevancy of the plurality of results, selecting the higher ranked results of the plurality of results, and creating one or more messages in the content sharing forum comprising at least one of the higher ranked results and links to the higher ranked results.

BRIEF DESCRIPTION OF THE DRAWINGS

FIG. 1B illustrates an example topic forum where certain subject matter experts are identified and a links are posted for direct communication to select topics according to example embodiments.

FIG. 10 illustrates an example of multiple topic forums where certain subject matter experts are identified and links are posted for direct communication to select topics between different forums according to example embodiments.

FIG. 2 illustrates an example of performing natural language processing to identify subject matter experts and topics for information sharing and related data management purposes according to example embodiments.

DETAILED DESCRIPTION OF THE APPLICATION

Figure 1A:
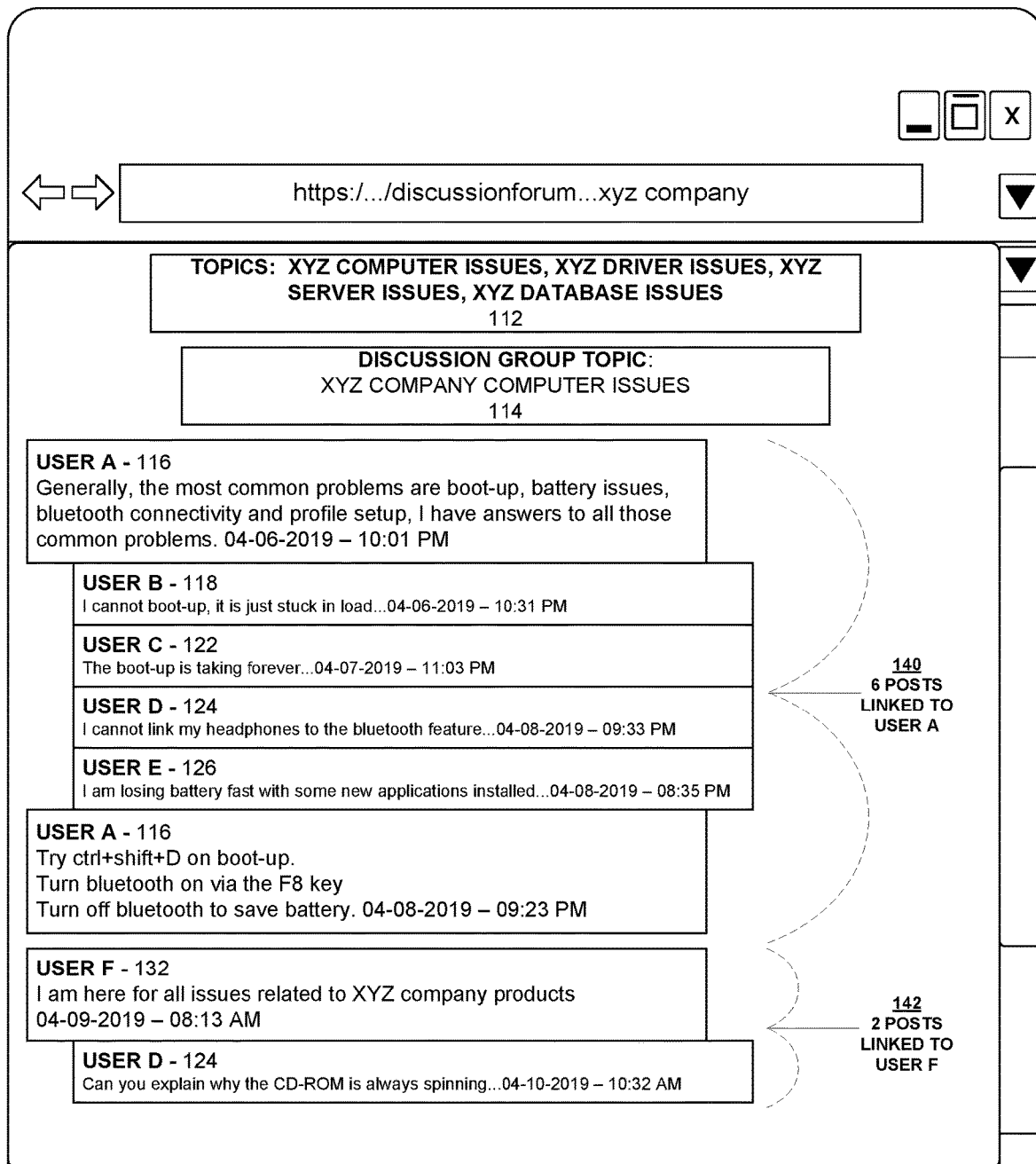
FIG. 1A illustrates an example topic forum where certain subject matter experts (SMEs) can be identified via natural language processing and other information processing operations according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for identifying content threads which are represented as topic forums or information forums or subject matter forums, such as online blogs, chat rooms, social networking applications and/or other information sources. In general, common problems users experience, such as device or software problems, including but not limited to troubleshooting for software issues, device operation, etc., may be best addressed by other users or information automation profiles (e.g., 'bots'), posting and responding to posts in an online accessible medium. A bot may be an application operating on a computing platform that is setup to perform certain operations, such as read, write, copy, delete, share, message creation, message transfers, etc. For example, when a user owns and operates a specific laptop personal computer and cannot setup certain features or is having trouble connecting a printer, content threads may include hundreds or thousands of users, posts, and other information being shared by other members to the forum or site where the information is shared and/or accessed.

The answers to common problems identified by the users of the forum may be shared by many users, and thus the answers to those problems are all over the Internet forums, however, those types of specific problems may not be easily shared by a search engine as the engine may use a complex algorithm to only share certain types of information while ignoring other types. Another popular topic may be old cars and their various parts and problems. The owner of an old car may not have posted manuals online especially if the car predates the Internet, however, other car enthusiasts may have all the answers available. One objective is to identify the main or proven topics in any forum via automated natural language processing (NLP), the profiles linked to those topics and to share those links with others who are actively searching for answers or profiles of authorities where they can post other questions and receive corresponding answers.

One example embodiment may include a process configured to process a natural language processing modules with various libraries of terms that are deemed valid information topics, sub-topics or related words and phrases. One or more forums may be identified each having at least one content thread as the information source of various topics, subject matter experts (SMEs), regular 'users', and other information shared among the participants. It is important to identify that various entities sharing in a common content thread may also include automated entities, which are afforded a user name and profile account, however, which are merely just automated natural language processing entities, such as 'bots', which interpret previous posts, titles of content threads, and then hold themselves out to be experts and share information by posting information and processing information from questions received under their own posted topics.

In an established forum, for example, one that has 50 or more posts as a forum minimum content threshold, the application may process all such content of the thread data by identifying all messages, both posted topics, answers, questions, third party information sources, etc., and indexing the posts by one or more topics. Each post/message may be linked to one or more topics. For example, a post about a 57 Chevy may refer to the vehicle and its engine, and thus the post may have topics of an "engine" and a "57 Chevy". The indexing is performed to share the indexed topic with other forums having relevant and overlapping content for targeted information sharing purposes. For example, an indexed topic in one forum may be shared with an index topic another forum once the SMEs are identified on such topics and/or sub-topics per the SME designation criteria discussed in detail throughout this specification.

Continuing with the same example, the messages may also be arranged into questions and answers and the profiles associated with such answers and questions. One specific criteria for identifying a SME is whether they answered a threshold number of questions (e.g., 10 or more) or not. If so, they may be deemed a SME, especially if they have a minimum threshold number of profiles asking questions (e.g., three or more), certainly one user profile asking questions may not be evidence that the particular answering profile has enough popularity to be deemed and SME. On a particular topic category, there may be several SMEs deemed implicit SMEs. However, among those various implicit SMEs, it may be optimal to only designate the top one to three as actual SMEs for information sharing purposes. Each implicit SME may be ranked according to various ranking criteria.

Examples of ranking criteria may include an earliest date the SME first communicated information in the forum, the earliest date of the SMEs may be given a weight of 5 (W5) on a 1-5 scale. The next criteria may be a number of answers, a number or questions posed to that particular SME indicated by sub-topic indentation as may be observed in FIG. 1A, User A 116 is a poster of information a users B-E are all sub-topic messages which may not receive the same weight for general information processing criteria purposes. Other ranking criteria may include a number of topics identified by the NLP processing and parsing of information. The length of answers, the relative satisfaction of other users via ranking of SMEs or merely just the context of their responses and repeated messages. Clearly, a user will not keep asking questions to a SME that cannot provide any relevant information. Another criteria may be the relative degree of compliance with a particular forum topic. For example, a main topic may be identified at the top of the forum and its relation to the SMEs messages may also be weighted to identify whether the SME is in the right forum or is just trying to create spam information that is not relevant. All the weights (W1-W5) for all the categories being measured may be summed together in an expression, such as the SUM of: (C1Wx, C2Wy, C3Wz . . . ), where the category is 'C' and the weight value is 1-5. The SMEs in a particular category with the highest or two highest weights may be identified as true SMEs which are then shared, including their profile information, clusters in which they participated, links to those cluster, etc. That information may be placed in a button or link which can be easily labeled and posted in any forum for easy access to the SMEs of other related forums. This provides a user seeking answers to certain questions in one forum with a potential lead/link to information in another forum via a pointer to the SME in an outside forum with valid topic information to the user's current forum.

FIG. 1A illustrates an example topic forum where certain subject matter experts can be identified via natural language processing and other information processing operations according to example embodiments. Referring to FIG. 1A, the configuration 100 illustrates a particular online discussion forum with an identified topic(s) of XYZ computer issues 112, etc., based on a particular manufacturer XYZ. The discussion topics or sub-topics 114 are identified for a particular content thread 114 as "XYZ company computer issues" Among the posts in the user interface are certain primary posts/messages, such as comments or invitations to other users. Examples include the user A—116 posts and the user F—132 posts. All other posts including users B-E (118-126) are question related messages which are subordinate posts linked to a particular leader post as indicated by the indentations. All such posts may be analyzed by a NLP module operating as part of a processor to identify messages, index the messages by topic based on parsing of message content, identify potential SMEs (implicit SMEs), and then further process the information to identify actual SMEs that are candidates for information sharing shortcuts both inside and outside the forum. In this example, processing the user A posts 140 led to a preliminary analysis that there are six posts linked to user A including answers and questions, and two posts 142 linked to user F. This raw number of 'posts' score may be one of many variables used to identify a SME and whether to create shortcuts to those SMEs for information sharing purposes.

FIG. 1B illustrates an example topic forum where certain subject matter experts are identified and links are posted for direct communication to select topics according to example embodiments. Referring to FIG. 1B, the example interface 150 illustrates the same discussion forum with the same content thread of messages. However, in this example, user A was deemed a valid SME. As a result, the user A is highlighted in an automated shortcut 146 created to provide links to those identified key topics which are being discussed on that particular content thread. In this example, the main sob-topics identified were "boot-up", "Bluetooth" and "battery" all of which are part of an XYZ company computer issues main topic. Those sub-topics may be identified automatically and placed in easy access links to the SME user A 116 via automated NLP.

FIG. 10 illustrates an example of multiple topic forums where certain subject matter experts are identified and links are posted for direct communication to select topics between different forums according to example embodiments. Referring to FIG. 10, the example provides the original discussion forum 112 and content thread 114 and an additional forum 152 and corresponding content thread 154. In this example user G 156 is attempting to identify information similar to the discussion in the original content thread 114. In this case, the automated sharing function of the application has inserted the notification list 146 in the second forum for easy access to the SME and corresponding thread in the first forum.

Figure 1D:
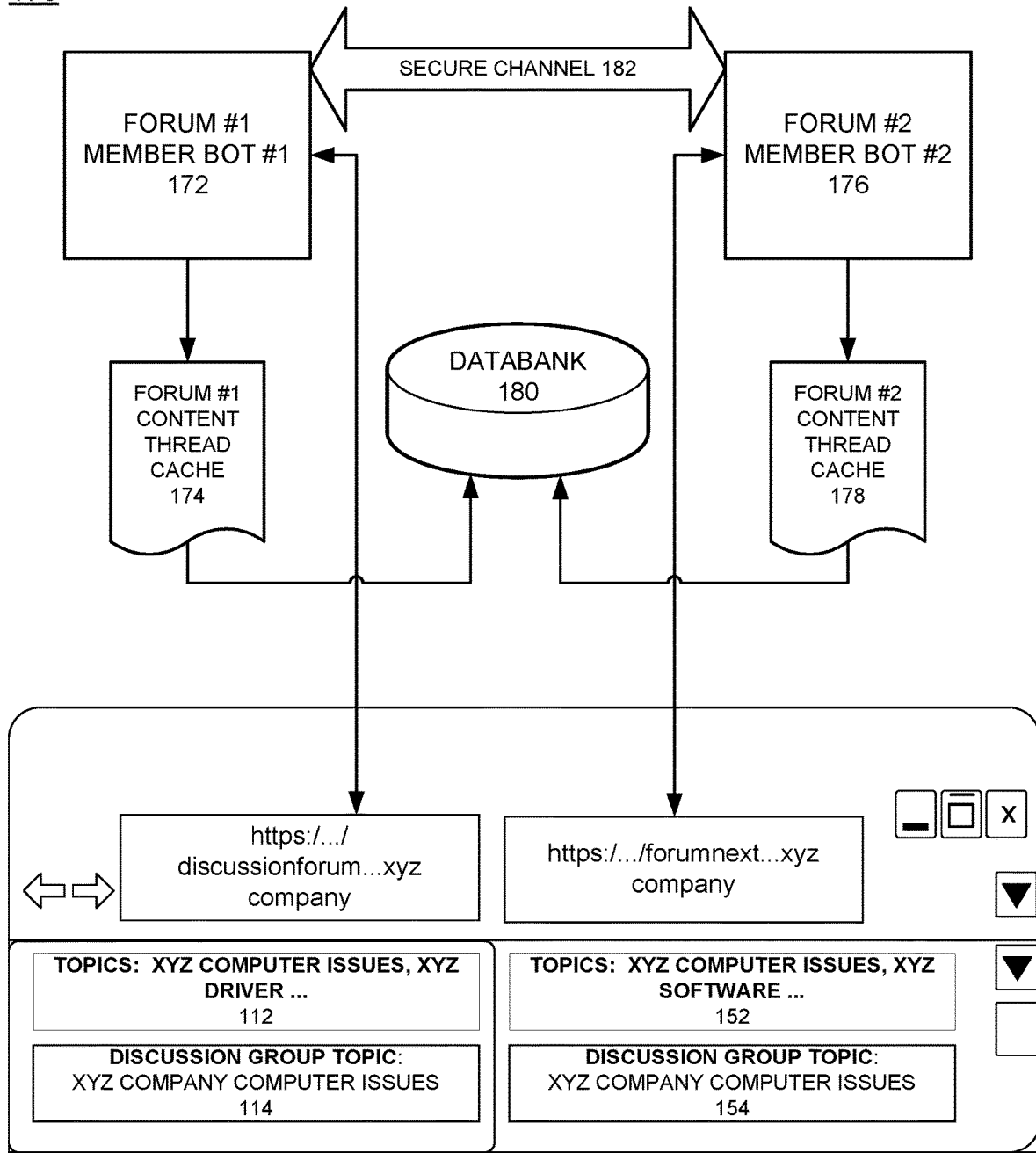
FIG. 1D illustrates an example of automated bot communication to other bots to identify relevant information based on shared content according to example embodiments.

FIG. 1D illustrates an example of automated bot communication to other bots to identify relevant information based on shared content according to example embodiments. Referring to FIG. 1D, the configuration 170 provides for bots 172 and 176 as multiple bots operating to perform automated tasks to manage content in respective content threads of various forums. The content from a first forum may be managed by a first bot 172, which processes the content, organizes the processed content locally as a cache 174 of relevant information which is then stored in a databank 180 for quick access. A similar approach may be performed by the other bots, in this example, the second bot 176, which creates its own content thread cache 178, which may also be stored in a databank 180. When one bot seeks to retrieve information outside its allocated information cache and forum, that first bot 172 may send a message via a secure channel 182 to at least one other bot 176. In response, the recipient bot 176 will identify the content of the request, create one or more additional queries and submit them to its own data cache 178. The results may be ranked, indexed and limited to provide the most relevant content back to the original requesting bot 172.

FIG. 2 illustrates an example of performing natural language processing to identify subject matter experts and topics for information sharing and related data management purposes according to example embodiments. Referring to FIG. 2, the NLP processing example 200 includes using a NLP library stored in a database to identify less common words, interdependencies of words, frequency of words and phrases, etc., to accurately select the words of interest for categorizing specific topics. A term or phrase may be identified as a less common word by removing common words. The word or phrase may be counted a number of times for a particular content thread to identify the relevance and to apply a weight to the word or phrase for category/topic selection. For example, the term "boot-up" appears numerous times and thus may be an automatically designated main topic that can be linked to a particular SME (user A 116) and then added to the notification list 146. The NLP summary 160 indicates certain metrics, such as word counting, a number of potential SMEs, weights applied to topics and/or SMEs based on the findings of the NLP.

Figure 3A:
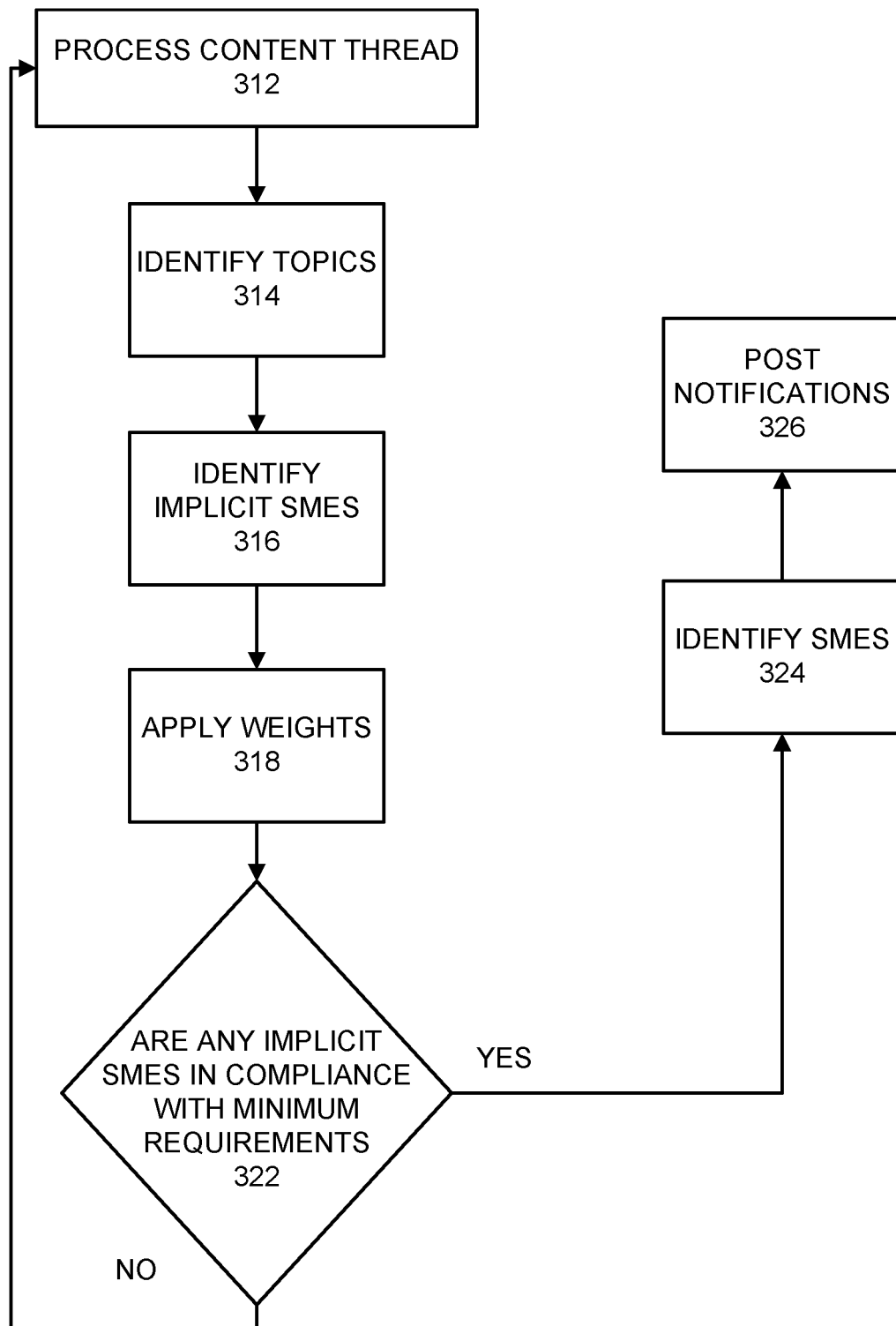
FIG. 3A illustrates a flow diagram of the logic included in processing forum information and identifying subject matter experts according to example embodiments.

FIG. 3A illustrates a flow diagram of the logic included in processing forum information and identifying subject matter experts according to example embodiments. Referring to FIG. 3A, the configuration provides for identifying main topics and identifying subject matter experts (SMEs) associated with those main topics. Also, by using automated bots to find information, the processing, memory and storage required for a computer, to retrieve content and replicate content, is optimized since the topics of interest are identified in specific locations and pointers/links are used to reference such information in other content sharing forums.

The example 300 provides identifying a particular content thread 312 in a content sharing forum via an online or related information source. The method further includes indexing all messages included in the content thread according to content of the messages to identify a plurality of topics 314, ranking the plurality of topics of the content thread to identify highest weighted topics based on content of messages included in the topics, and identifying one or more topic experts associated with the highest weighted topics 316. The weights may be applied 318 to categorize those topics and/or SMEs, the weights can be applied to user profiles and topics. If any SMEs are in compliance with the minimum requirements 322 (e.g., minimum weights, message threshold requirements, etc.), then those SMEs are identified 324 as actual/true SMEs and notifications are posted 326 to create notification that include the one or more topic experts and the highest weighted topics. The posting may occur as a notification in the content sharing forum. The ranking of topics in the content thread may also include identifying a number of messages posted within a particular topic and applying a higher weight to the topics with a larger number of messages than other ones of the topics to create the highest weighted topics.

In general, the one or more topic experts associated with the highest weighted topics are higher weighted topic experts than other topic experts, the higher weighted topic experts may have posted more messages than other ones of the topic experts in the content sharing forum. The higher weighted topic experts may have received more messages, posted from other members of the content sharing forum, than other ones of the topic experts in the content sharing forum.

Figure 3B:
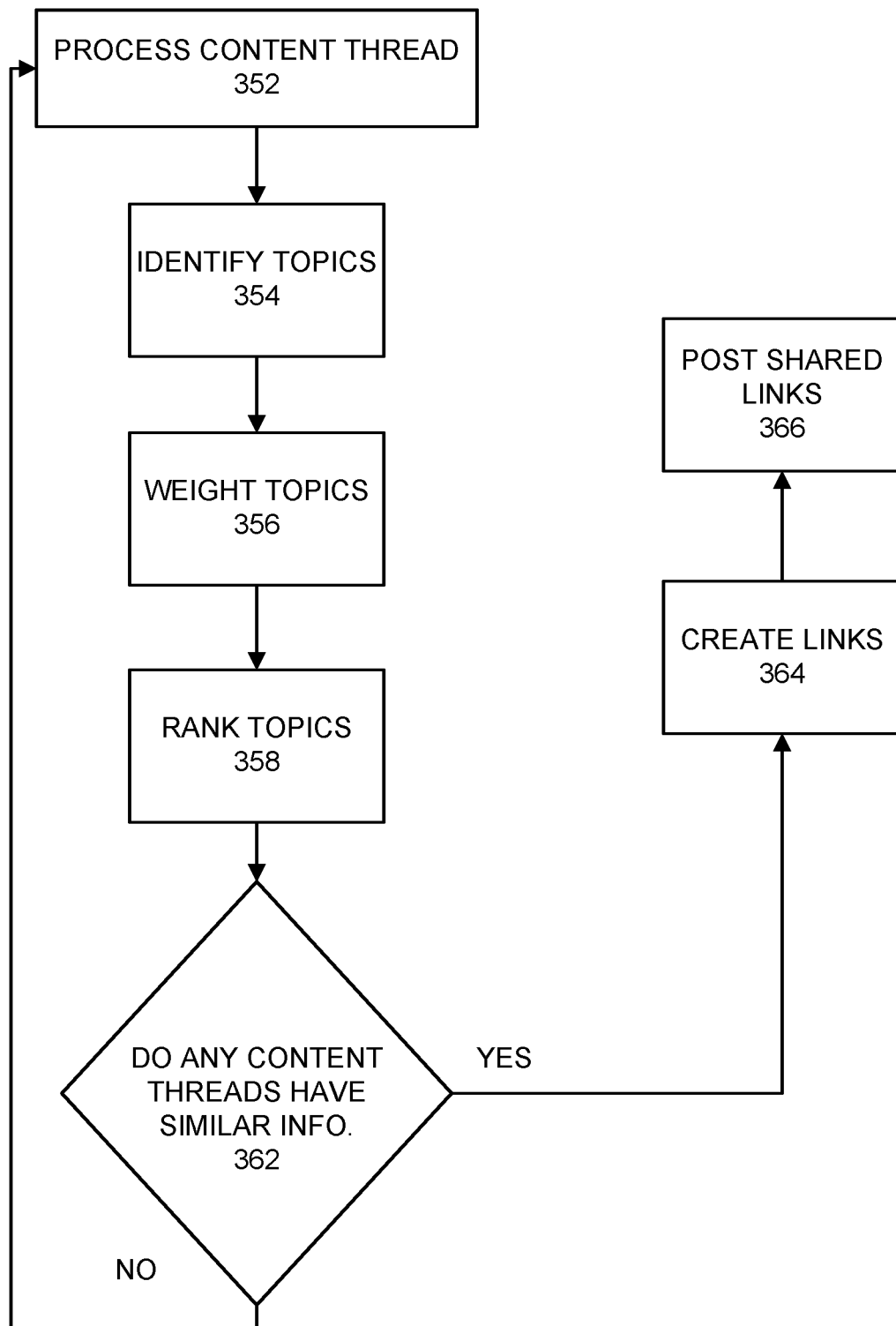
FIG. 3B illustrates a flow diagram of the logic included in processing forum information and sharing certain information among other forums according to example embodiments.

FIG. 3B illustrates a flow diagram of the logic included in processing forum information and sharing certain information among other forums according to example embodiments. In this example 350, finding important topics and sharing them with other forums may offer cross-forum information sharing. The method may also include identifying and processing 352 a content thread in a content sharing forum, selecting topics of the content thread to identify topics 354, weighting those topics based on the NLP criteria 356, where the highest weighted topics, based on content of messages included in the topics, are ranked 358. A determination is made 362 as to whether any content threads have similar information. If so, the notifications/links are created 364 and posted 366 in various forums with similar content.

The method may also include identifying messages from the content thread, and indexing the messages into topic clusters to identify various different topics included in the content thread. The ranking of topics of the content thread further includes identifying a number of messages posted within a particular topic and applying a higher weight to the topics with a larger number of messages than other ones of the topics to create the highest weighted topics. The share link may be posted as a notification in the one or more other content threads under the topics with similar content to the content of the highest weighted topics of the content thread. The share link is created to access the highest weighted topics by an automated communication bot. Also, the share link is a uniform resource locator (URL) link type, and the communication bot performs the ranking of the content thread to identify highest weighted topics, and the designat-ing of the one or more of the highest weighted topics as the topics of interest is performed via automated natural language processing.

Figure 3C:
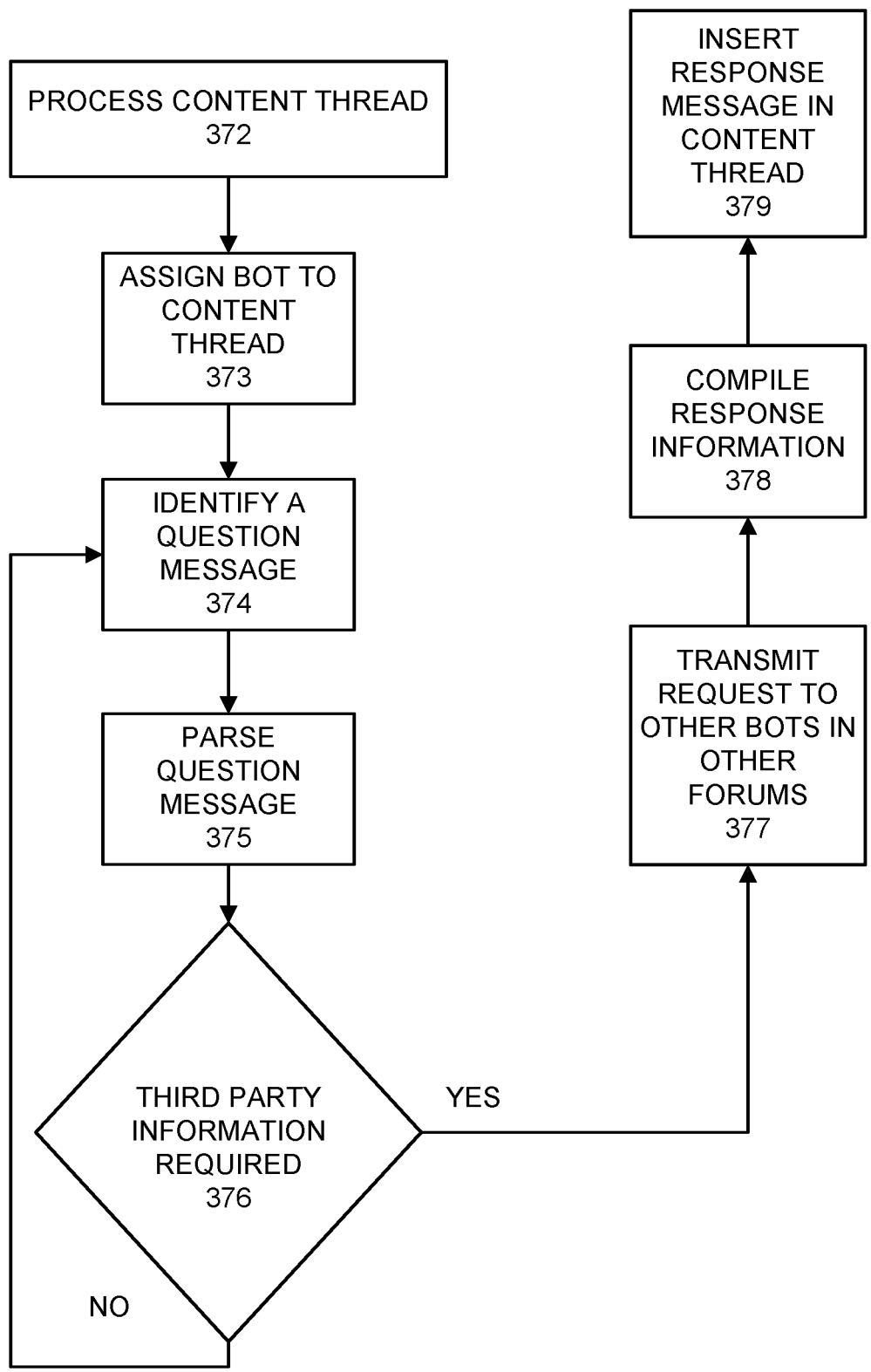
FIG. 3C illustrates a flow diagram of the logic included in processing forum information via a bot and seeking third party information from other bots representing other forums according to example embodiments.

FIG. 3C illustrates a flow diagram of the logic included in processing forum information via a bot and seeking third party information from other bots representing other forums according to example embodiments. Referring to FIG. 3C, the example method 370 may include processing content thread information 372 from one or more original content sources (e.g., forums) of which the bot is an affiliated member or has regular access to content included in that particular forum. The method also includes assigning 373 a bot to process messages of the content thread 372, identifying, via the bot, a question message 374, such as an outstanding message requiring an answer, parsing the question message content to identify topics of interest 375, processing the messages of the content thread to identify response information related to the question message 376, determining the response information to the question message requires third party information 376, since it may not be available in the current forum thread, and transmitting a request, with the question message content, to one or more other bots operating in other content sharing forums 377. The bots may operate in their own communication network via an established secure channel 182. Each bot may have its own cached version (174, 178) of its respective content thread stored in a shared or separate databank 180 for easy access since the content is already parsed, indexed, ranked, etc. The method may also include receiving a response message from the one or more other bots and compiling the response information 378. The information that is ranked and/or reduced from other information can be shared in the form of a response message included in the content thread 379 of the original forum where the question was identified.

In other examples, the bot and the various other bots are identified as members of one or more respective content sharing forums. Ideally, one bot would be identified per forum, however, a one-to-one relationship is not necessarily the actual membership status since some bots may be members of other forums.

The method may also include performing natural language processing on content of the messages, creating indexed topics based on the natural language processing, storing the indexed topics in a database, and retrieving the indexed topics from the database when processing the messages of the content thread to identify response information related to the question message. The indexed topics stored in the database are provided from the bot and the one or more other bots. Further to retrieving the indexed topics from the database when processing the messages of the content thread to identify response information related to the question message, this procedure may also provide retrieving one or more indexed topics associated with the content sharing forum prior to retrieving any indexed topics associated with the other content sharing forums. When the bots are sharing information, a confirmation may be received from one or more of the other bots that the relevant response information is available in another of the other content sharing forums. The method may also provide receiving a link to one or more messages in the other content sharing forums, and posting the link in a new message corresponding to the questions message in the content sharing forum.

Figure 3D:
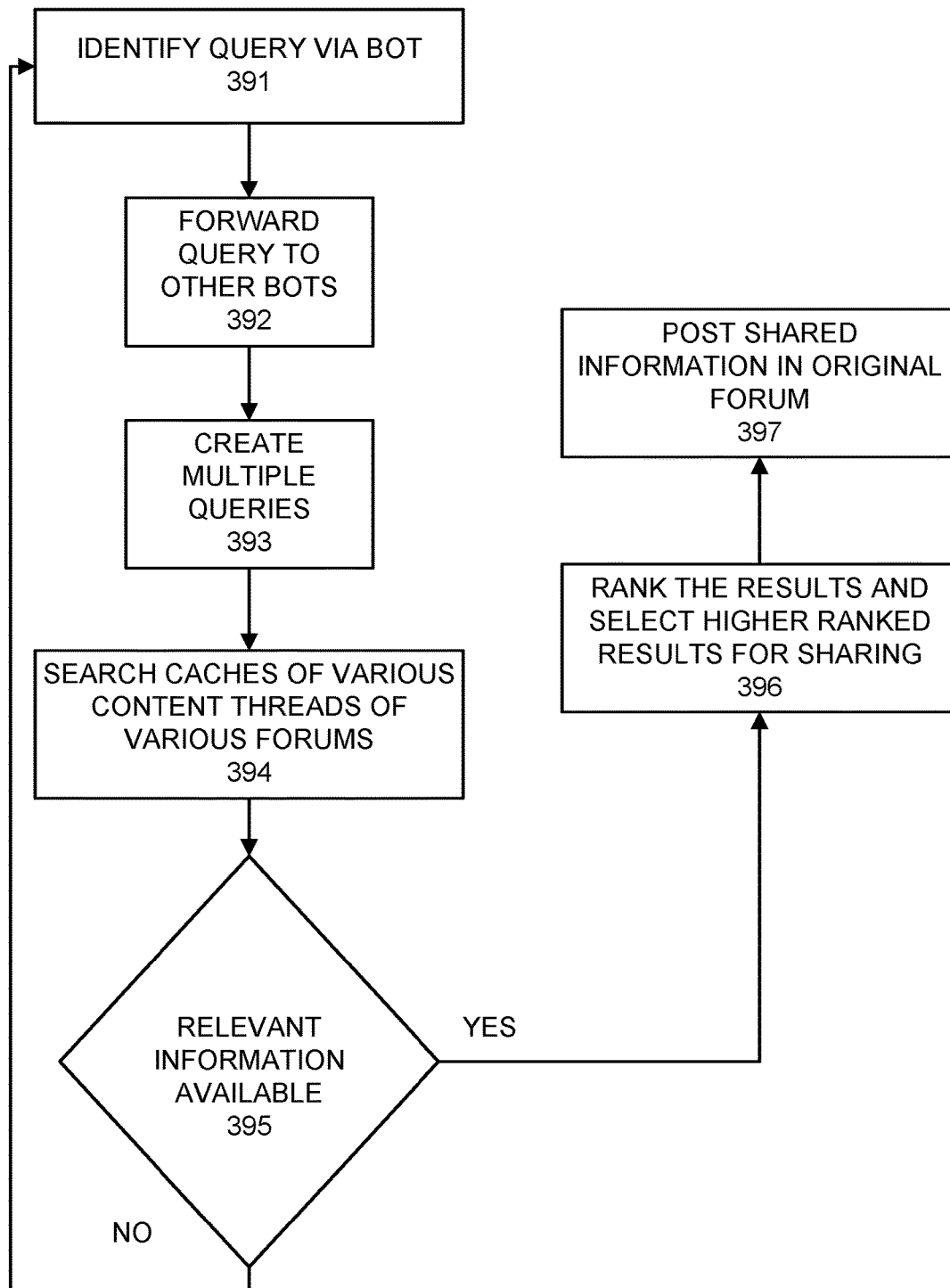
FIG. 3D illustrates a flow diagram of the logic included in processing a query and seeking additional information via other bots representing other forums according to example embodiments.

FIG. 3D illustrates a flow diagram of the logic included in processing a query and seeking additional information via other bots representing other forums according to example embodiments. Referring to FIG. 3D, the method 390 may include identifying, via a bot, a query 391 to retrieve content information in a content sharing forum, transmitting the query and the content information to a plurality of other bots 392, so each of the plurality of bots are associated with respective different content sharing forums, creating a plurality of queries based on the query 393 and transmitting the plurality of queries to a respective plurality of caches associated with the respective different content sharing forums to identify/search 394 whether relevant information 395 associated with the plurality of queries is available for retrieval. This provides a way for all bots to query their own cached data for relevant information.

The method may also include receiving a plurality of results based on the plurality of queries, ranking the plurality of results to determine relevancy of the plurality of results 396 and selecting the higher ranked results of the plurality of results, and creating one or more messages in the content sharing forum with at least one of the higher ranked results and links to the higher ranked results 397. The bot and the plurality of other bots are identified as respective members of the content sharing forum and other content sharing forums. The method may also include creating a secure channel between the bot and the plurality of other bots prior to transmitting the query. When ranking the plurality of results, the method may include identifying a number of messages posted within one or more topics of the one or more of content forums, and applying a higher weight to the one or more topics with a larger number of messages than other ones of the topics to create the higher ranked results. The ranking of the plurality of topics to identify higher ranked results is performed via automated natural language processing. The method may also include applying weights to the plurality of results based on a frequency of content identified for the plurality of results, for example, more common results may be ranked higher and weighted higher due to the popularity of those results. Also, the links can include a uniform resource locators (URLs) to one or more of the content sharing forums.

Figure 4:
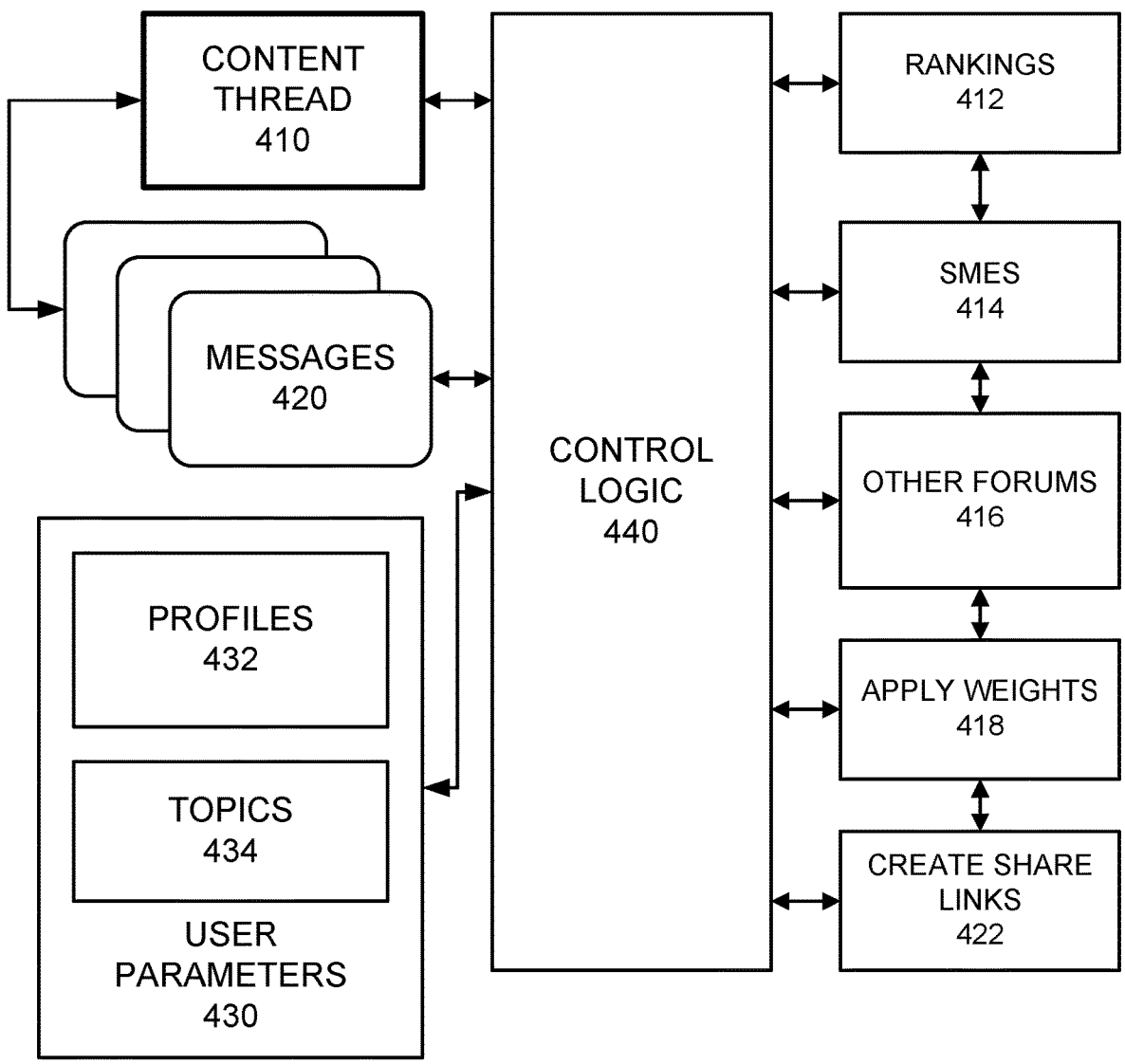
FIG. 4 illustrates a logic diagram with example data input and output parameters for a content forum processing procedure according to example embodiments.

FIG. 4 illustrates a logic diagram with example data input and output parameters for a content forum processing procedure according to example embodiments. Referring to FIG. 4, example 400 includes a control logic module 440 that acts as a processor to receive inputs, process information, and provide outputs. The fundamental processing may include, for example, receiving a content thread 410 of information, identifying the content thread one message at a time 420 to identify topics, potential SMEs, and other information. The members of the forum may have profiles 432 and topics 434 linked to their specific user parameters 430, and such information can be processed and stored for reference purposes. The output of the processing may include providing rankings 412, identifying the SMEs 414, determining other forums 416, applying weights 418 to the topic information and/or the SMEs, the result is notifications and/or shared links 422 which are created and shared in the forum and other forums with links and references to the types of information which are trending for those processed content threads.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components of the other figures.

Figure 5:
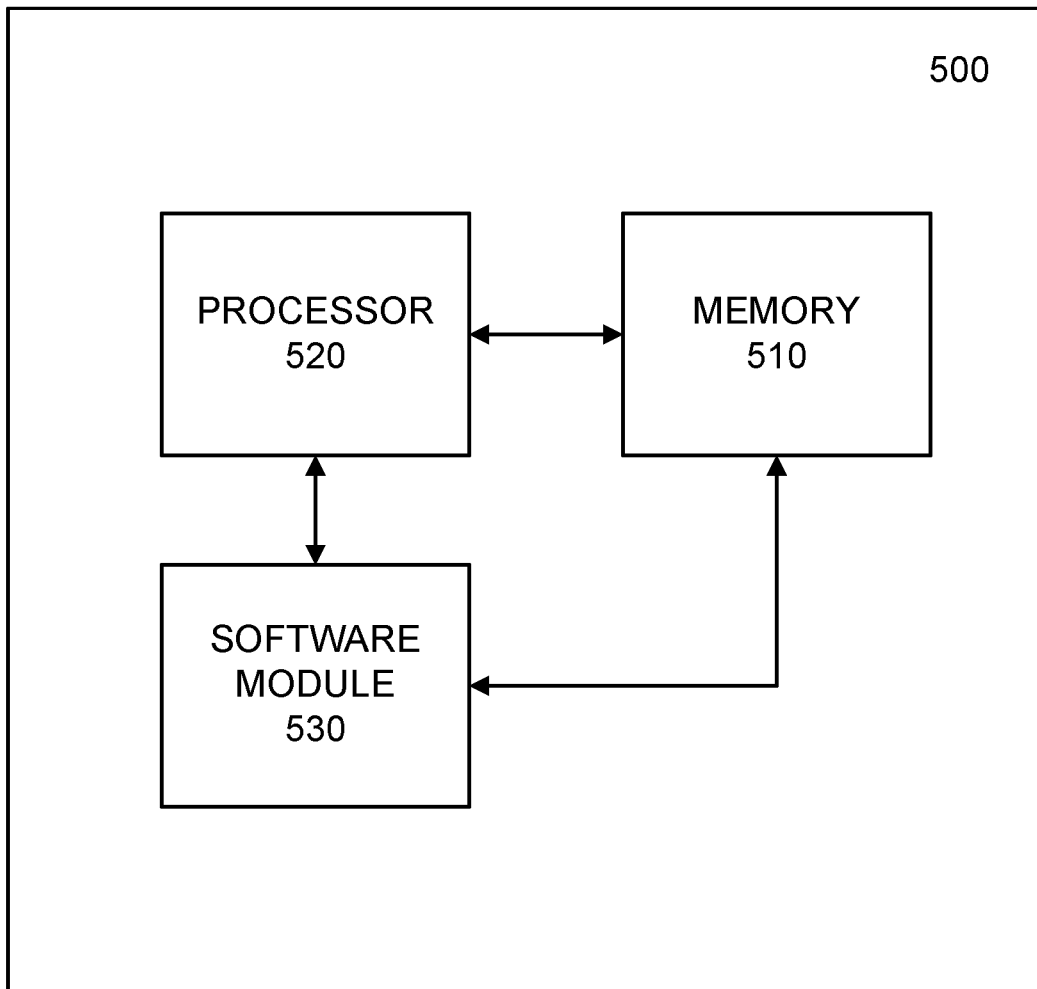
FIG. 5 illustrates an example network entity device configured to store instructions, software, and corresponding

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving, by one or more other bots, a query from a first bot, associated with a first content sharing forum, to retrieve content information from the first content sharing forum, wherein each bot, of the one or more other bots, corresponds to a particular different content sharing forum and the different content sharing forums are different than the first content sharing forum;
   creating, by each bot of the one or more other bots, one or more queries based on the query;
   transmitting, by each bot of the one or more other bots, the one or more queries to one or more caches, wherein each of the one or more caches corresponds to one of the particular different content sharing forums;
   retrieving, by each bot of the one or more other bots, a query result from the corresponding one or more caches based on the one or more queries;
   ranking, by each bot of the one or more other bots, a content of the query result;
   selecting, by each bot of the one or more other bots, a content of the query result having a certain rank; and
   creating, by each bot of the one or more other bots, one or more messages in the first content sharing forum, each of the one or more messages comprising the selected content and a link to a query result containing the selected content.

2. The method of claim 1, wherein the first bot and the one or more other bots are identified as respective members of the first content sharing forum and different content sharing forums.

3. The method of claim 1, wherein the receiving the query further comprises:
   receiving the query via a secure channel between the first bot and the one or more other bots.

4. The method of claim 1, wherein the ranking a content of the query result further comprises:
   identifying messages posted within the corresponding different content sharing forums; and
   weighting the messages based on a number of topics associated with each message.

5. The method of claim 2, wherein the ranking a content of the query result further comprises:
   ranking the content via automated natural language processing.

6. The method of claim 1, further comprising:
   weighting the content of the query result based on a frequency of occurrence of the content.

7. The method of claim 1, wherein the link comprises a uniform resource locator (URL) to a corresponding one of the different content sharing forums.

8. A system, comprising:
   a first bot associated with a first content sharing forum, the first bot comprising a processor configured to:
      identify a query to retrieve content information from the content sharing forum; and
      transmit the query to one or more other bots, wherein each bot, of the one or more other bots, corresponds to a particular different content sharing forum and the different content sharing forums are different than the first content sharing forum, wherein each bot of the one or more other bots comprises processor configured to:
         create one or more queries based on the query;
         transmit the one or more queries to one or more caches, wherein each of the one or more caches corresponds to one of the particular different content sharing forums;
         retrieve a query result from the corresponding one or more caches based on the one or more queries;
         rank a content of the query result;

select a content of the query result having a certain rank; and create one or more messages in the first content sharing forum, each of the one or more messages comprising the selected content and a link to a query result containing the selected content.

9. The system of claim 8, wherein the first bot and the one or more other bots are identified as respective members of the first content sharing forum and different content sharing forums.

10. The system of claim 8, wherein, when the processor of the first bot is configured to transmit the query, the processor of the first bot is further configured to:

transmit the query via a secure channel between the first bot and the one or more other bots.

11. The system of claim 8, wherein the ranking a content of the query result further comprises:

identify messages posted within the corresponding different content sharing forums; and weight the messages based on a number of topics associated with each message.

12. The system of claim 9, wherein, when the processor of each bot of the one or more other bots is configured to rank the content, the processor of each bot of the one or more other bots is further configured to:

rank the content via automated natural language processing.

13. The system of claim 8, wherein the processor of each bot of the one or more other bots is further configured to:

weight the content of the query result based on a frequency of occurrence of the content.

14. The system of claim 8, wherein the link comprises a uniform resource locator (URL) to a corresponding one of the different content sharing forums.

15. A non-transitory computer readable storage medium configured to store one or more instructions that when executed by a processor of each bot of one or more other bots cause the processor to perform:

receive a query from a first bot, associated with a first content sharing forum, to retrieve content information from the first content sharing forum, wherein each bot, of the one or more other bots, corresponds to a particular different content sharing forum and the different content sharing forums are different than the first content sharing forum;

creating one or more queries based on the query;

transmitting the one or more queries to one or more caches, wherein each of the one or more caches corresponds to one of the particular different content sharing forums;

retrieving a query result from the corresponding one or more caches based on the one or more queries;

ranking a content of the query result;

selecting a content of the query result having a certain rank; and creating one or more messages in the first content sharing forum, each of the one or more messages comprising the selected content and a link to a query result containing the selected content.

16. The non-transitory computer readable storage medium of claim 15, wherein the first bot and the one or more other bots are identified as respective members of the first content sharing forum and different content sharing forums.

17. The non-transitory computer readable storage medium of claim 15, wherein the receiving the query further comprises:

receiving the query via a secure channel between the first bot and the one or more other bots.

18. The non-transitory computer readable storage medium of claim 15, wherein the ranking a content of the query result further comprises:

identifying a number of messages posted within the corresponding different content sharing forums; and weighting the messages based on a number of topics associated with each message.

19. The non-transitory computer readable storage medium of claim 16, wherein the ranking a content of the query result further comprises:

ranking the content via automated natural language processing.

20. The non-transitory computer readable storage medium of claim 15, wherein the one or more instruction further cause the processor to perform:

weighting the content of the query result based on a frequency of occurrence of the content.

* * * * *